(12) United States Patent
Kim

(10) Patent No.: US 7,973,864 B2
(45) Date of Patent: Jul. 5, 2011

(54) LIQUID CRYSTAL DISPLAY

(75) Inventor: Dong-Gyu Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 839 days.

(21) Appl. No.: 12/016,648

(22) Filed: Jan. 18, 2008

(65) Prior Publication Data

US 2008/0273131 A1 Nov. 6, 2008

(30) Foreign Application Priority Data

May 3, 2007 (KR) .................. 10-2007-0043101

(51) Int. Cl.
 *G02F 1/1343* (2006.01)
 *G02F 1/136* (2006.01)
(52) U.S. Cl. .............. 349/38; 349/48; 349/42; 349/138; 349/139
(58) Field of Classification Search ............ 349/38, 349/41, 42, 56, 43, 39, 138, 139, 122, 143, 349/144, 147, 48
See application file for complete search history.

(56) References Cited

U.S. PATENT DOCUMENTS

| 2008/0158452 A1* | 7/2008 | Wu .................... 349/34 |
| 2008/0273131 A1* | 11/2008 | Kim ................... 349/38 |
| 2010/0118012 A1* | 5/2010 | Irie et al. ............ 345/211 |
| 2010/0123842 A1* | 5/2010 | Lee et al. ............ 349/39 |

* cited by examiner

*Primary Examiner* — Brian M Healy
(74) *Attorney, Agent, or Firm* — H.C. Park & Associates, PLC

(57) ABSTRACT

A liquid crystal display includes a substrate first and second gate lines; first and second data lines, a storage electrode line, a first thin film transistor having a control terminal connected to the first gate line and an input terminal connected to the first data line, a second thin film transistor having a control terminal connected to the first gate line and an input terminal connected to the first data line, a first sub-pixel electrode connected to the output terminal of the first thin film transistor, a second sub-pixel electrode connected to the output terminal of the second thin film transistor, a third thin film transistor having a control terminal connected to the second gate line and an input terminal connected to the first sub-pixel electrode, and a first capacitive conductor connected to the output terminal of the third thin film transistor and overlapping a portion of the storage electrode line to form a voltage reducing capacitor.

23 Claims, 13 Drawing Sheets

LIQUID CRYSTAL DISPLAY

CROSS-REFERENCE TO RELATED APPLICATION

This application claims priority from and the benefit of Korean Patent Application No. 10-2007-0043101, filed on May 3, 2007, which is hereby incorporated by reference for all purposes as if fully set forth herein.

BACKGROUND OF THE INVENTION

1. Field of the Invention

The present invention relates to a liquid crystal display.

2. Discussion of the Background

Liquid crystal displays (LCDs) are one of the most widely used flat panel displays. An LCD includes a pair of panels provided with field-generating electrodes, such as pixel electrodes and a common electrode, and a liquid crystal (LC) layer interposed between the two panels. The LCD displays images when voltages are applied to the field-generating electrodes, thereby generating an electric field in the LC layer that determines the orientations of LC molecules therein to adjust polarization of incident light.

Among LCDs, a vertical alignment (VA) mode LCD, which aligns LC molecules such that the long axes thereof are perpendicular to the panels in the absence of an electric field, is spotlighted because of its high contrast ratio and wide viewing angle.

The wide viewing angle of the VA mode LCD may be realized by cutouts in the field-generating electrodes. Since the cutouts may determine the tilt directions of the LC molecules, the tilt directions may be distributed in several directions using the cutouts such that the viewing angle is widened.

However, the VA mode LCD has poor lateral visibility as compared with front visibility. To improve the lateral visibility of the VA mode LCD, one pixel may be divided into two sub-pixels and different voltages may be applied to each sub-pixel. One sub-pixel receives a higher voltage through a switching element and the other sub-pixel may be coupled to the sub-pixel connected to the switching element through a coupling capacitor so that it may receive a lower voltage.

However, when connecting two sub-pixels with a coupling capacitor, the pixels may discharge more slowly, thereby generating afterimages.

SUMMARY OF THE INVENTION

The present invention provides an LCD that may prevent the generation of an afterimage and improve lateral visibility by preventing a delay of an electric discharge of pixels.

Additional features of the invention will be set forth in the description which follows, and in part will be apparent from the description, or may be learned by practice of the invention.

The present invention discloses a liquid crystal display including a substrate and first, second, and third adjacent gate lines disposed on the substrate. First and second adjacent data lines are insulated from and cross the first, second, and third gate lines. A storage electrode line is insulated from and crosses the first, second, and third gate lines. The liquid crystal display further includes a first thin film transistor having a control terminal connected to the first gate line and a input terminal connected to the first data line, a second thin film transistor having a control terminal connected to the first gate line and an input terminal connected to the first data line, a first sub-pixel electrode connected to the output terminal of the first thin film transistor, a second sub-pixel electrode connected to the output terminal of the second thin film transistor, a third thin film transistor having a control terminal connected to the second gate line and an input terminal connected to the first sub-pixel electrode, and a first capacitive conductor connected to the output terminal of the third thin film transistor. The first capacitive conductor is formed from the same layer as the first and second sub-pixel electrodes and overlaps a portion of the storage electrode line to form a first voltage reducing capacitor. A first buffer electrode is connected to the output terminal of the third thin film transistor and overlaps a portion of the second sub-pixel electrode to form a first voltage increasing capacitor. A fourth thin film transistor has a control terminal connected to the second gate line and an input terminal connected to the second data line, and a fifth thin film transistor has a control terminal connected to the second gate line and an input terminal connected to the second data line. A third sub-pixel electrode is connected to the output terminal of the fourth thin film transistor, a fourth sub-pixel electrode is connected to the output terminal of the fifth thin film transistor, and a sixth thin film transistor having a control terminal is connected to the third gate line and an input terminal connected to the third sub-pixel electrode. A second capacitive conductor is connected to the output terminal of the sixth thin film transistor and is formed from the same layer as the third and fourth sub-pixel electrodes. The second capacitive conductor overlaps a portion of the storage electrode line to form a second voltage reducing capacitor. A second buffer electrode is connected to the output terminal of the sixth thin film transistor and overlaps a portion of the fourth sub-pixel electrode to form a second voltage increasing capacitor. The storage electrode line includes a first portion disposed at equal distances from the first and second data lines, a second portion connected to the first portion and detouring around the right side of the third thin film transistor, and a third portion connected to the first portion and detouring around the left side of the sixth thin film transistor. An interval between the first and second data lines is wider than an interval between the first and second gate lines.

The present invention also discloses a liquid crystal display including a substrate, first and second adjacent gate lines disposed on the substrate, first and second adjacent data lines insulated from and crossing the first and second gate lines, and a storage electrode line insulated from and crossing the first and second gate lines. A first thin film transistor has a control terminal connected to the first gate line and an input terminal connected to the first data line, and a second thin film transistor has a control terminal connected to the first gate line and an input terminal connected to the first data line. A first sub-pixel electrode is connected to the output terminal of the first thin film transistor, a second sub-pixel electrode is connected to the output terminal of the second thin film transistor, a third thin film transistor having a control terminal is connected to the second gate line and an input terminal connected to the first sub-pixel electrode, and a first capacitive conductor is connected to the output terminal of the third thin film transistor. The first capacitive conductor overlaps a portion of the storage electrode line to form a voltage reducing capacitor.

The present invention also discloses a liquid crystal display including a substrate a first gate line disposed on the substrate and including first and second gate electrodes, a second gate line including a third gate electrode and neighboring the first gate line, and a gate insulating layer covering the first and second gate lines. First, second, and third semiconductors are formed on the gate insulating layer and respectively disposed on the first, second, and third gate electrodes. A data line is formed on the gate insulating layer and crosses the first and second gate lines. First and second source electrodes are respectively disposed on the first and second semiconductors, and a third source electrode is disposed on the gate insulating layer and disposed on the third semiconductor. A first drain electrode faces the first source electrode on the first semiconductor, a second drain electrode faces the second source electrode on the second semiconductor, and a third drain electrode faces the third source electrode on the third semiconductor. A storage electrode line is disposed on the gate insulating layer and crosses the first and second gate lines, and a plurality of ohmic contacts is disposed between the first, second, and third source electrodes and the first, second, and third semiconductors, and the first, second, and third drain electrodes and the first, second, and third semiconductors. A passivation layer covers the data line, the third source electrode, the first, second, and third drain electrodes, and the storage electrode line. The first passivation layer has first, second, third, and fourth contact holes that respectively expose the third source electrode and the first, second, and third drain electrodes. A first sub-pixel electrode is disposed on the passivation layer and respectively connected to the third source electrode and the first drain electrode through the first and second contact holes, and a second sub-pixel electrode is disposed on the passivation layer and connected to the second drain electrode through the third contact holes. A capacitive conductor is disposed on the passivation layer and connected to the third drain electrode through the fourth contact holes. The capacitive conductor overlaps a portion of the storage electrode line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
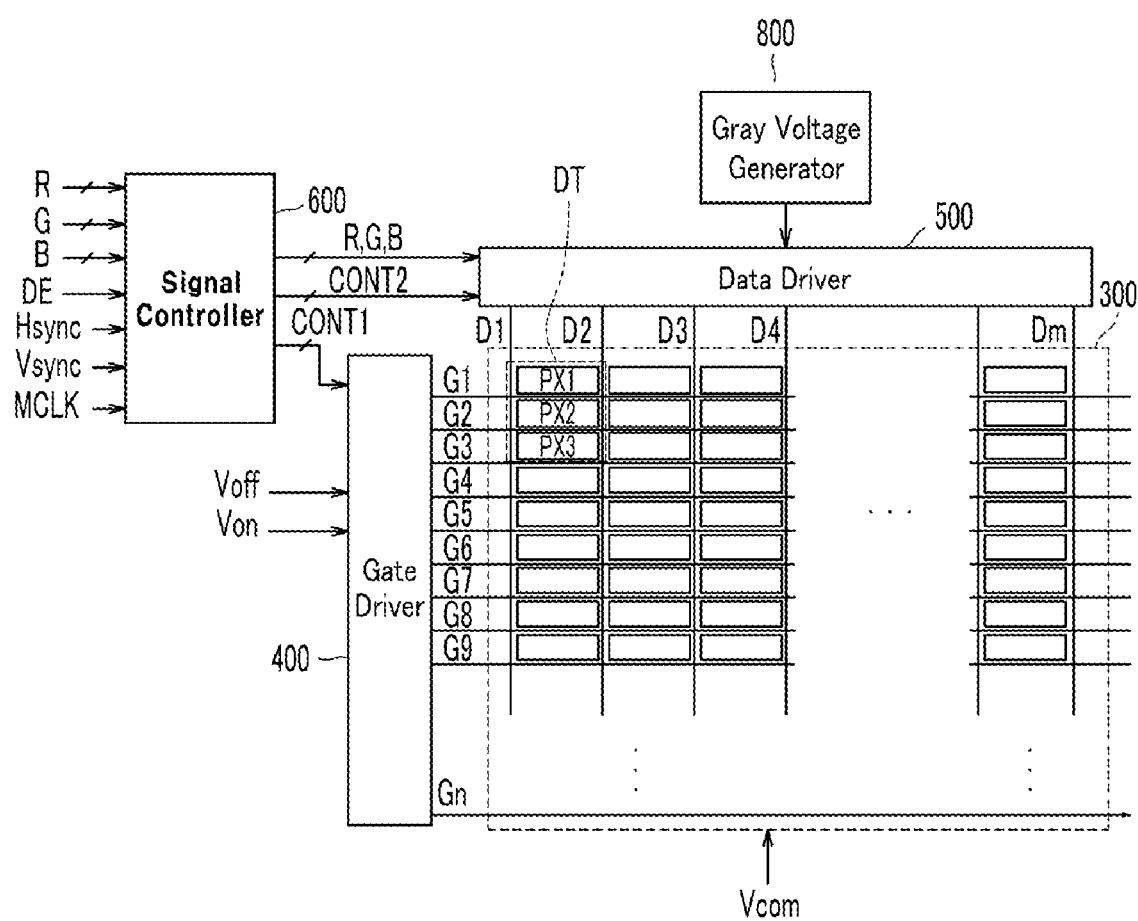
FIG. 1 is a block diagram of an LCD according to an exemplary embodiment of the present invention.

The invention is described more fully hereinafter with reference to the accompanying drawings, in which embodiments of the invention are shown. This invention, may however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements of layers may be present. In contrast, when an element is referred to as being "directly on" or "directly connected to" another element or layer, there are no intervening elements or layers present.

LCDs according to exemplary embodiments of the present invention will be described in detail below with reference to the accompanying drawings.

Figure 2:
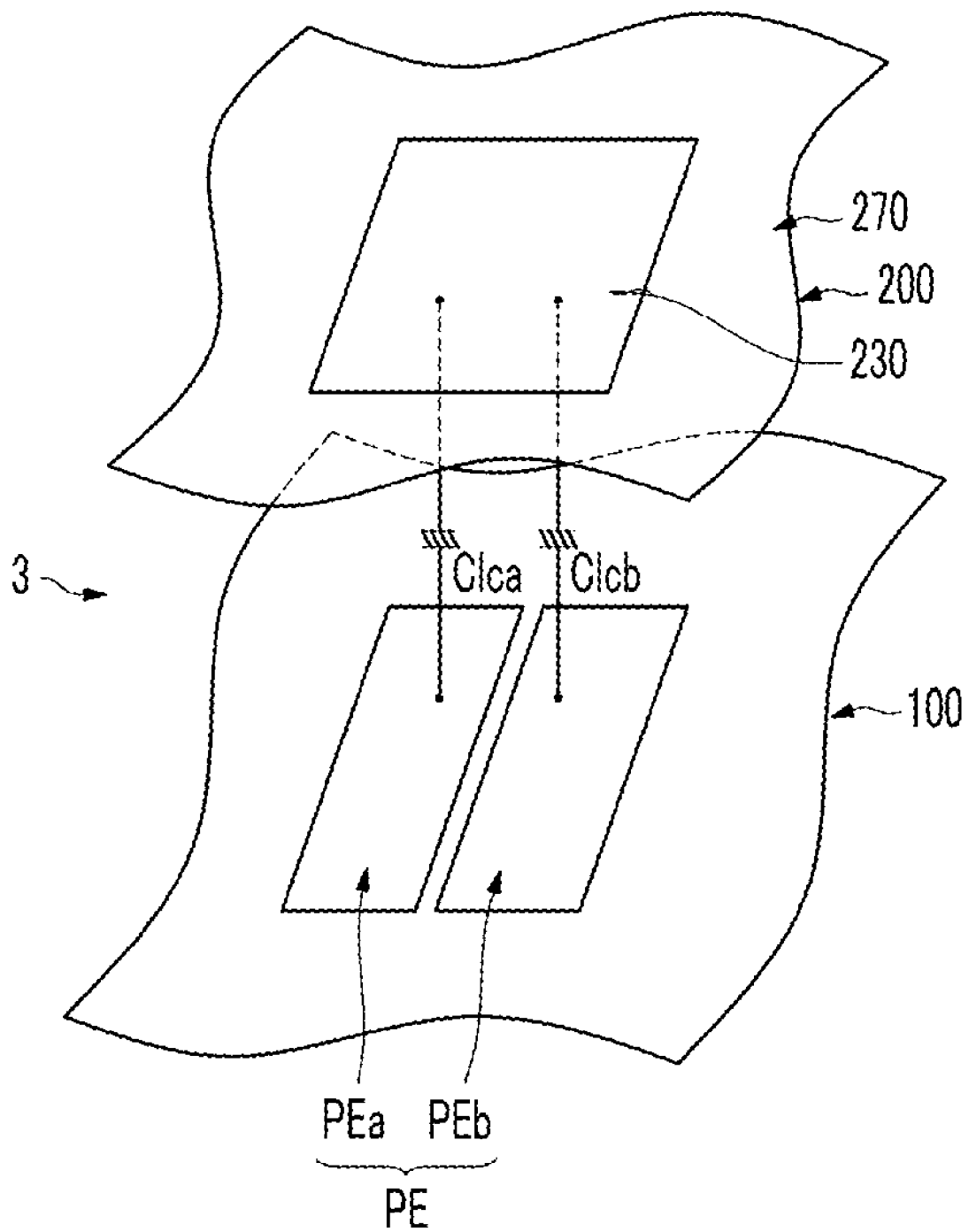
FIG. 2 is an equivalent circuit diagram of two sub-pixels of an LCD according to an exemplary embodiment of the present invention.

FIG. 1 is a block diagram of an LCD according to an exemplary embodiment of the present invention, and FIG. 2 is an equivalent circuit diagram of two sub-pixels of an LCD according to an exemplary embodiment of the present invention.

As shown in FIG. 1, an LCD according to an exemplary embodiment of the present invention includes an LC panel assembly 300, a gate driver 400 and a data driver 500 connected to the LC panel assembly 300, a gray voltage generator 800 connected to the data driver 500, and a signal controller 600 to control the above elements. The gate driver 400 may include a pair of drivers disposed at respective sides of the LC panel assembly 300.

The LC panel assembly 300 includes a plurality of signal lines G1-Gn and D1-Dm, and a plurality of pixels PX1, PX2, and PX3 connected to the signal lines and arranged substantially in a matrix, as seen in FIG. 1. The LC panel assembly 300 further includes lower and upper panels 100 and 200 that face each other and an LC layer 3 interposed therebetween, as in the structural view shown in FIG. 2.

The signal lines G1-Gn and D1-Dm include a plurality of gate lines G1-Gn to transmit gate signals (also referred to as "scanning signals") and a plurality of data lines D1-Dm to transmit data signals. The gate lines G1-Gn extend substantially in a row direction and are substantially parallel to each other, and the data lines D1-Dm extend substantially in a column direction and are substantially parallel to each other.

Each pixel PX1, PX2, and PX3 has an elongated shape and extends in the row direction, and includes a pair of sub-pixels PEa and PEb. Each sub-pixel PEa and PEb includes an LC capacitor Clca and Clcb, and a switching element (not shown) connected to the signal lines and the LC capacitor Clca and Clcb.

The switching element including a thin film transistor is a three-terminal element provided on the lower panel 100, and the control terminal thereof is connected to the gate line Gn, the input terminal thereof is connected to the data line Dm, and the output terminal thereof is connected to an LC capacitor Clca or Clcb and a storage capacitor (not shown).

The LC capacitor Clca or Clcb includes a sub-pixel electrode PEa or PEb provided on the lower panel 100 and a common electrode 270 provided on an upper panel 200 as two terminals, and the LC layer 3 disposed between the sub-pixel electrode PEa or PEb and the common electrode 270 functions as a dielectric of the LC capacitor Clca or Clcb. The sub-pixel electrodes PEa and PEb are separated from each other and together form a pixel electrode PE. The common electrode 270 is formed on the entire surface of the upper panel 200 and supplied with a common voltage Vcom.

The storage capacitor functioning as an auxiliary capacitor for the liquid crystal capacitor Clca or Clcb is formed by overlapping another signal line (not shown) provided on the lower panel 100 with a pixel electrode PE via an insulator disposed therebetween, and this signal line is supplied with a predetermined voltage such as a common voltage Vcom.

In the meantime, in order to implement color display, each pixel PX1, PX2, and PX3 uniquely displays one of the primary colors (spatial division) or each pixel PX1, PX2, and PX3 sequentially displays the primary colors in turn (temporal division) so that a spatial or temporal sum of the primary colors are recognized as a desired color. An example of a set of the primary colors is three primary colors including red, green, and blue. FIG. 2 shows an example of the spatial division in which each pixel PX1, PX2, PX3 includes a color filter 230 representing one of the primary colors in an area of the upper panel 200 facing the pixel electrode PE. Unlike FIG. 2, the color filter 230 may be provided on or under the pixel electrode PE on the lower panel 100. Color filters 230 of the pixels PX1, PX2, and PX3 that are adjacent to each other in a row direction are connected to each other to extend along the row direction, and color filters 230 representing different colors from each other are alternately arranged in the column direction.

In this way, pixels PX1, PX2, and PX3, which represent three primary colors, form a dot DT that is a fundamental unit for displaying images.

Referring to FIG. 1 again, the gate driver 400 is connected to the gate lines G1-Gn of the LC panel assembly 300 and synthesizes a gate-on voltage Von and a gate-off voltage Voff to generate gate signals, which are applied to the gate lines G1-Gn.

The data driver 500 is connected to the data lines D1-Dm of the LC panel assembly 300 and selects the gray voltages supplied from the gray voltage generator 800 and then applies a selected gray voltage to the data lines D1-Dm as a data signal.

Each driver 400 and 500 mentioned above may be directly mounted on the LC panel assembly 300 in the form of at least one integrated circuit (IC) chip. Alternatively, each driver 400 and 500 may be mounted on a flexible printed circuit film (not shown) in a tape carrier package (TCP) type that is attached to the LC panel assembly 300 or on a separate printed circuit board (not shown). As yet another alternative, each driver 400 and 500 may be integrated with the LC panel assembly 300, the signal lines G1-Gn, D1-Dm, and the switching elements.

The signal controller 600 may control the gate driver 400 and the data driver 500.

The signal controller 600 is supplied with input image signals R, G, and B and input control signals for controlling the display thereof from an external graphics controller (not shown). The input control signals include a vertical synchronization signal Vsync, a horizontal synchronization signal Hsync, a main clock signal MCLK, and a data enable signal DE.

On the basis of the input control signals and the input image signals R, G, and B, the signal controller 600 generates gate control signals CONT1 and data control signals CONT2 and processes the image signals R, G, and B to be suitable for the operation of the panel assembly 300 and the data driver 500. The signal controller 600 sends the gate control signal CONT1 to the gate driver 400 and sends the data control signals CONT2 to the data driver 500.

Now, a structure of the LC panel assembly will be described in detail with reference to FIG. 3, FIG. 4, FIG. 5, FIG. 6, FIG. 7, and FIG. 8 along with FIG. 1 and FIG. 2 described above.

Figure 3:
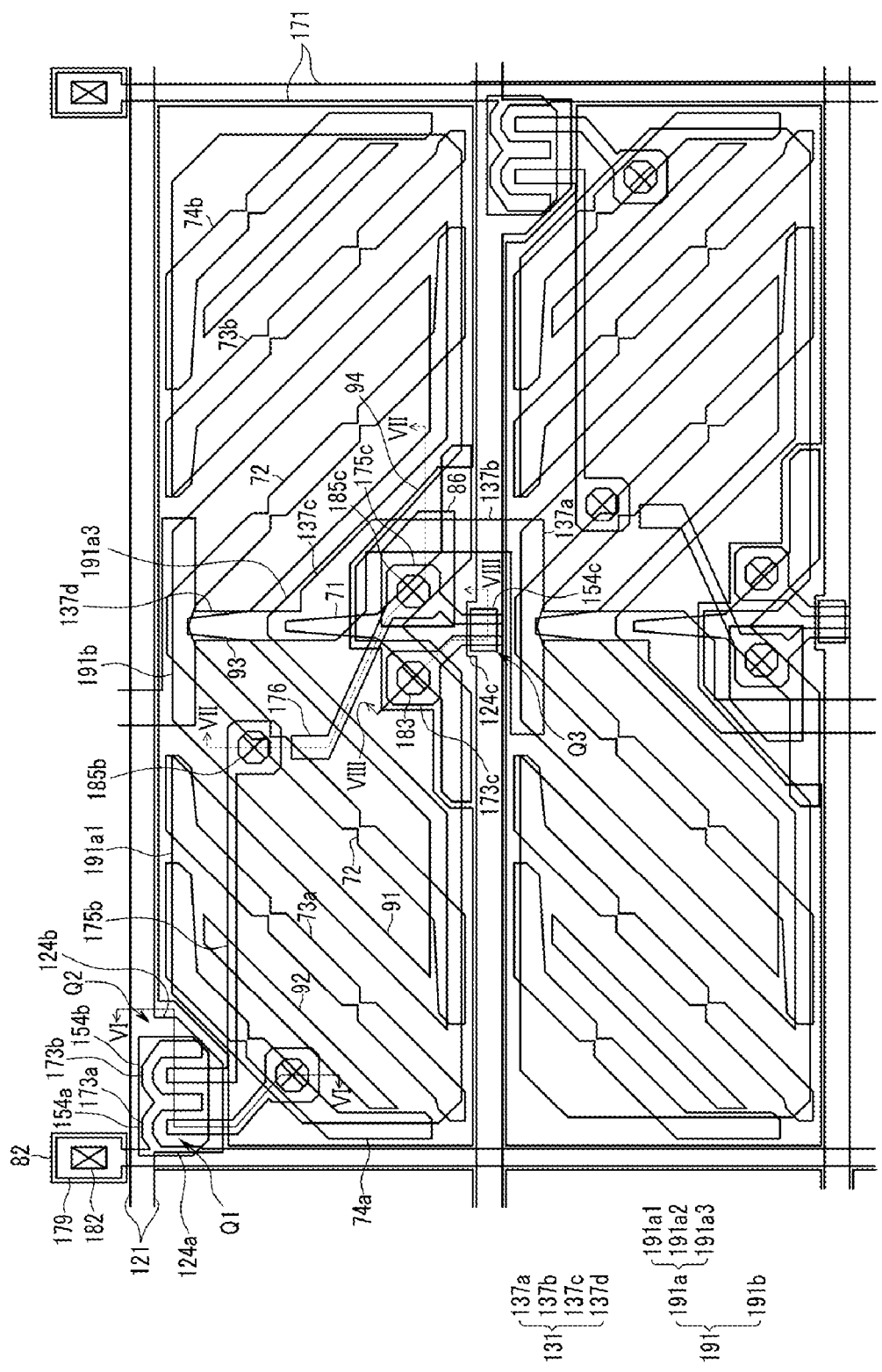
FIG. 3 is a layout view of an LCD to an exemplary embodiment of the present invention.
Figure 4:
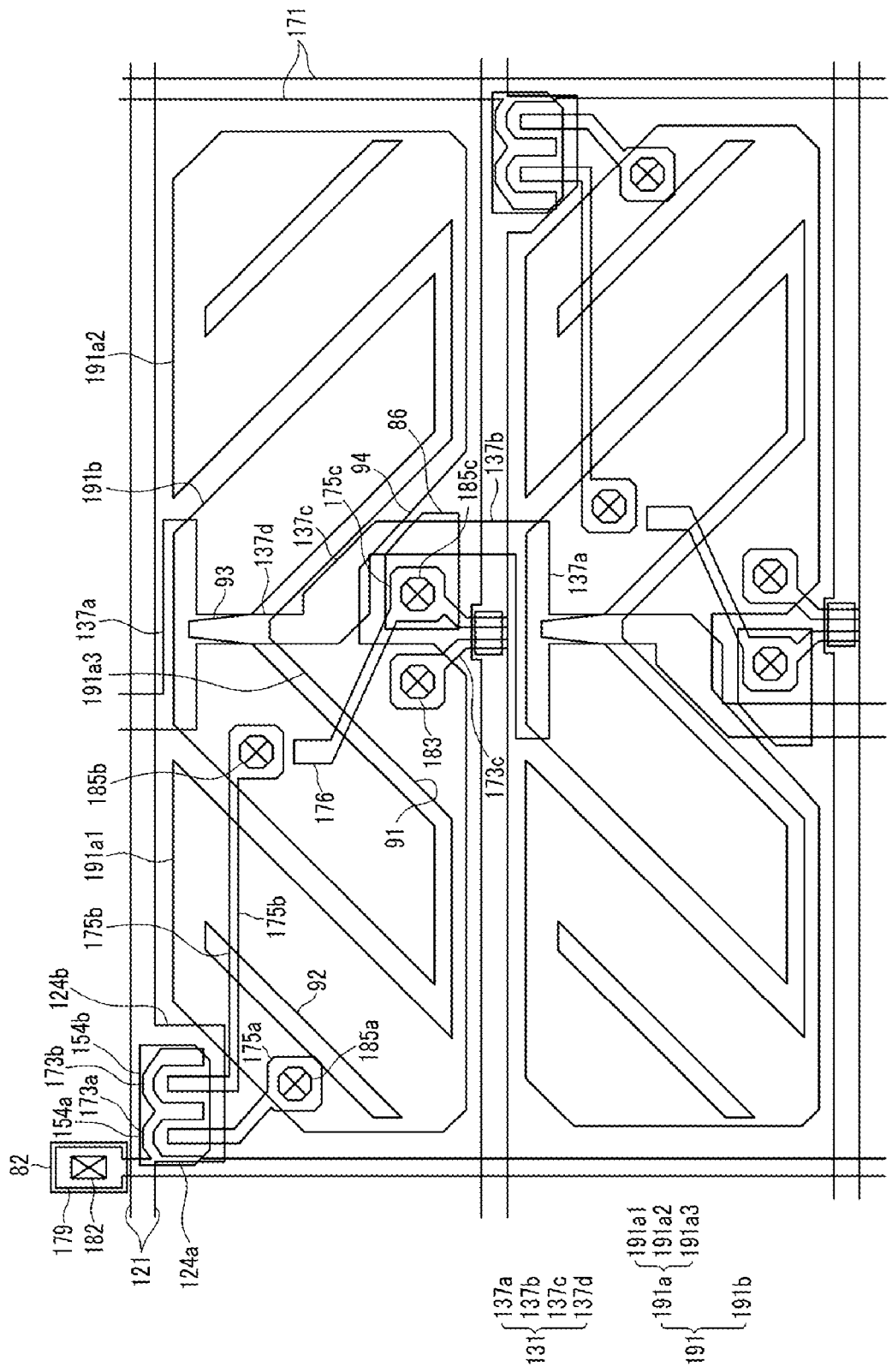
FIG. 4 is a layout view of a lower panel for the LCD shown in FIG. 3.
Figure 5:
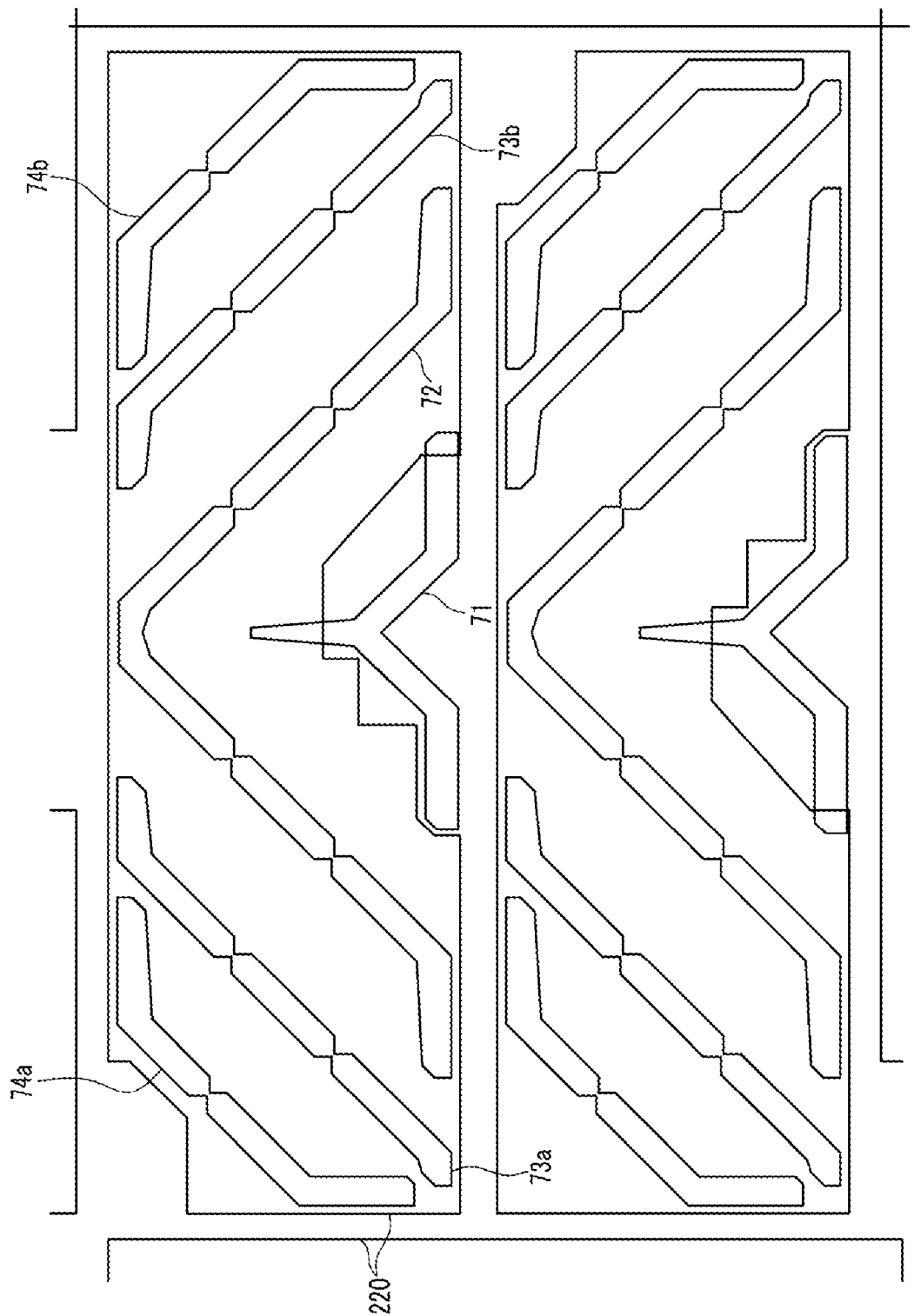
FIG. 5 is a layout view of an upper panel for the LCD shown in FIG. 3.
Figure 6:
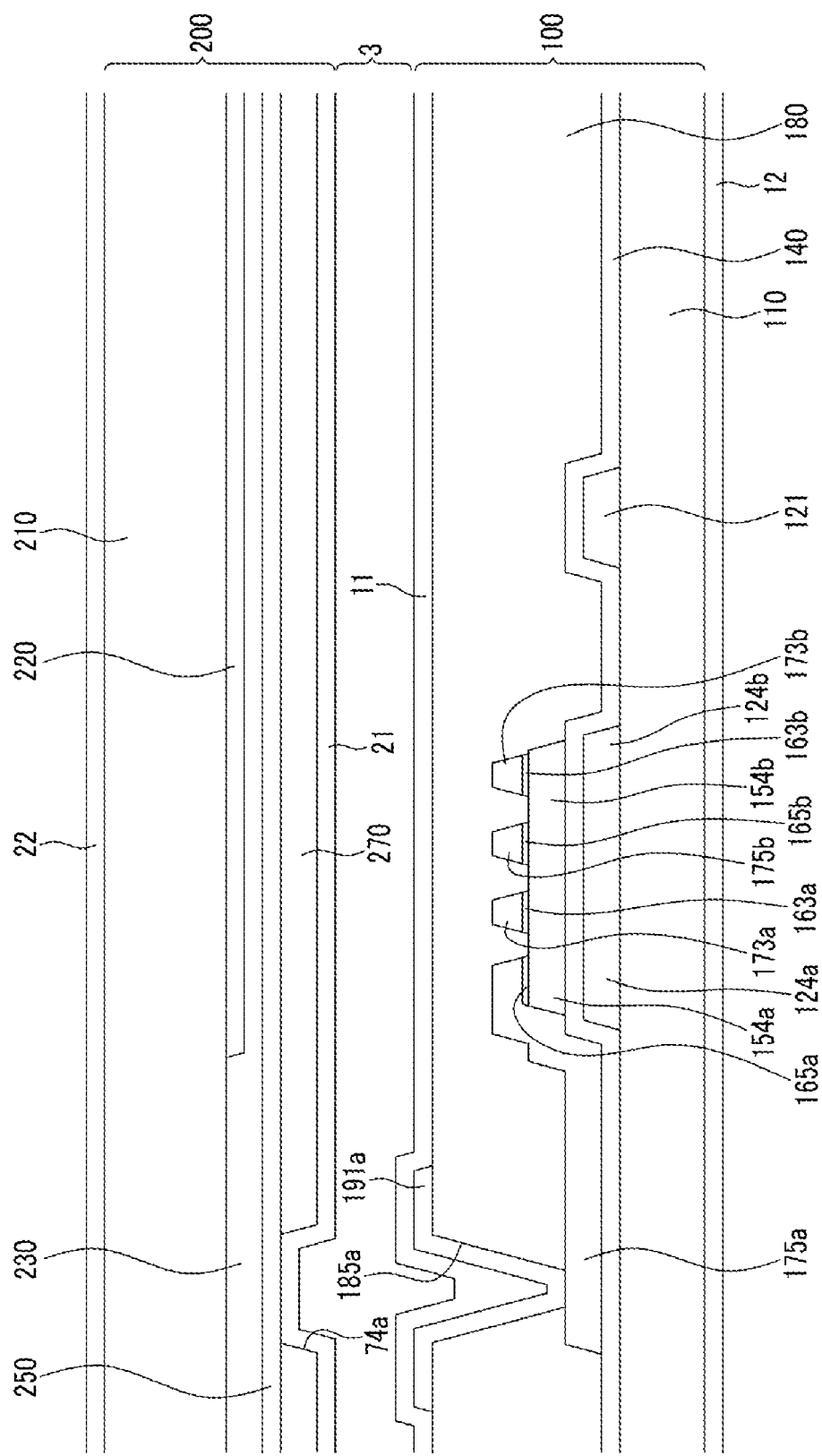
FIG. 6, FIG. 7, and FIG. 8 are cross-sectional views of the LCD shown in FIG. 3 taken along line VI-VI, line VII-VII, and line VIII-VIII, respectively.
Figure 7:
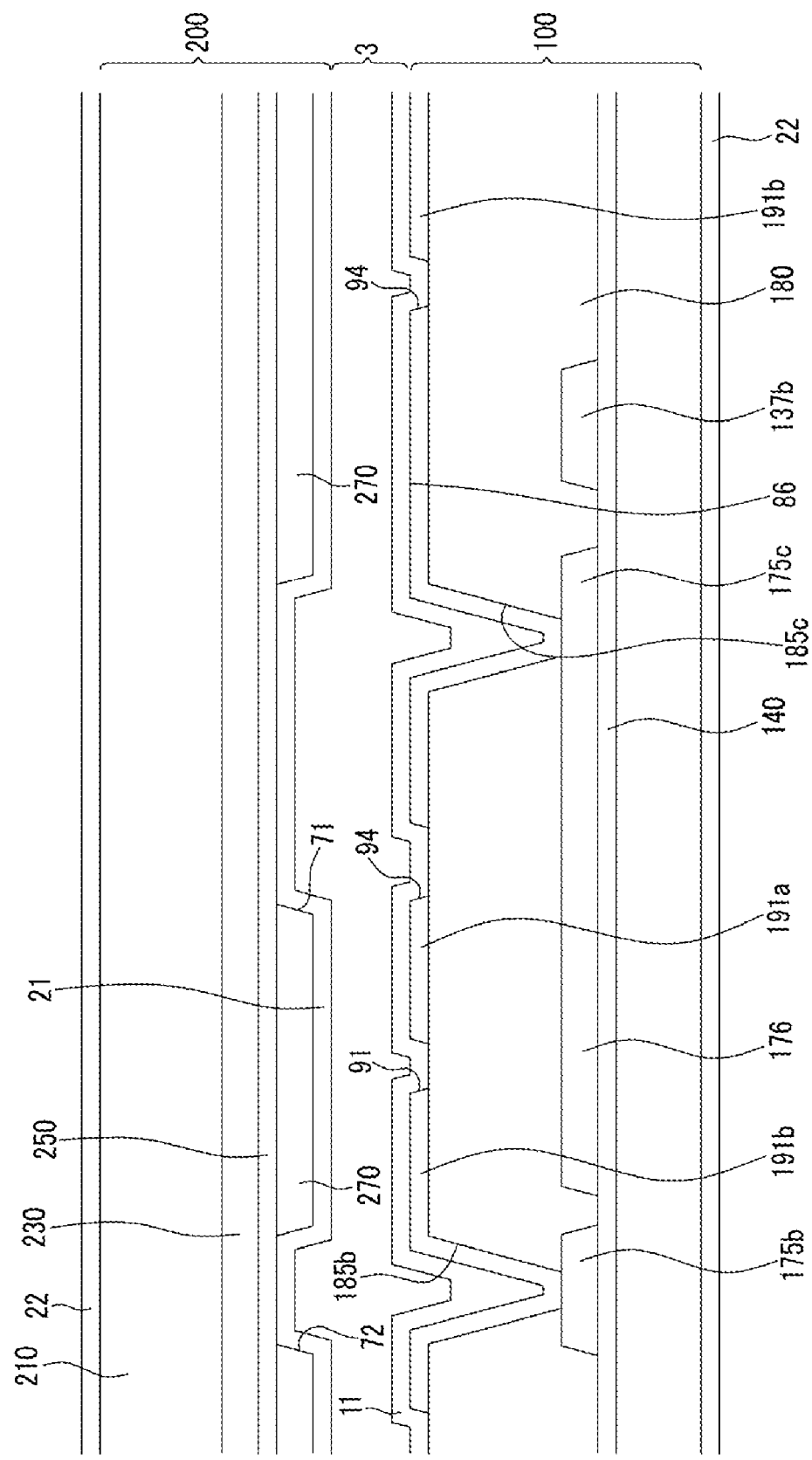
Figure 8:
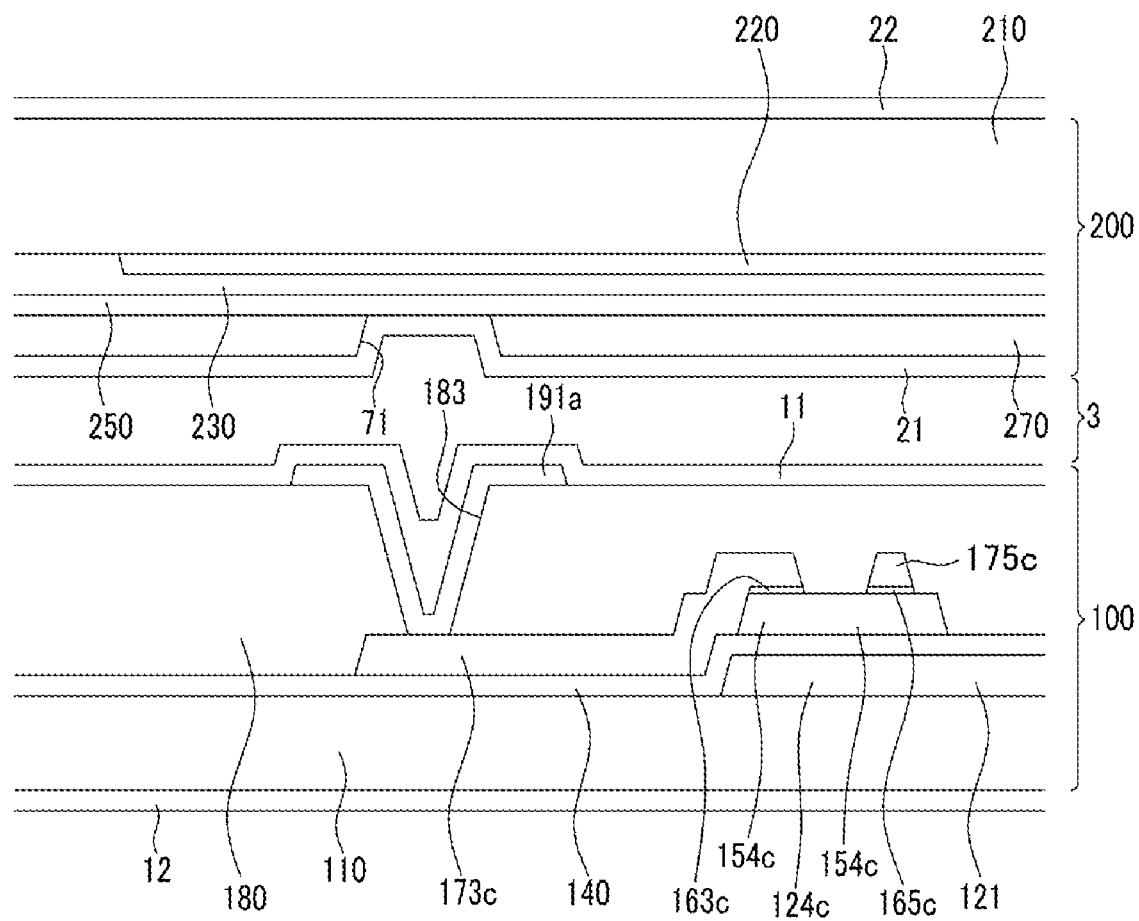

FIG. 3 is a layout view of an LCD to an exemplary embodiment of the present invention, FIG. 4 is a layout view of a lower panel for the LCD shown in FIG. 3, FIG. 5 is a layout view of an upper panel for the LCD shown in FIG. 3, and FIG. 6, FIG. 7, and FIG. 8 are cross-sectional views of the LCD shown in FIG. 3 taken along line VI-VI, line VII-VII, and line VIII-VIII, respectively.

An LCD according to an exemplary embodiment of the present invention includes a lower panel 100, an upper panel 200 opposing the lower panel 100, and an LC layer 3 interposed between the two panels 100 and 200.

First, the lower panel 100 will be described in detail with reference to FIG. 3, FIG. 4, FIG. 6, FIG. 7, and FIG. 8.

A plurality of gate lines 121 is formed on an insulating substrate 110, which may include transparent glass.

The gate lines 121, which are spaced from each other, extend substantially in a row direction and transmit gate signals. Each gate line 121 includes a plurality of first and second gate electrodes 124a and 124b extending in a downward direction and a plurality of third gate electrodes 124c extending in an upward direction. The first and second gate electrodes 124a and 124b may separately extend from the gate lines 121, but make up one body such that a portion of the body is used as the first gate electrodes 124a and the remaining portion of the body is used as the second electrodes 124b.

The gate lines 121 may include an aluminum—(Al) containing metal such as Al and an Al alloy, a silver—(Ag) containing metal such as Ag and a Ag alloy, a copper—(Cu) containing metal such as Cu and a Cu alloy, a molybdenum—(Mo) containing metal such as Mo and a Mo alloy, chromium (Cr), tantalum (Ta), titanium (Ti), or a combination thereof. Alternatively, the gate lines 121 may have a multi-layered structure including two conductive layers (not shown) having different physical properties. One of the two conductive layers may include a low resistivity metal, such as an Al-containing metal, an Ag-containing metal, or a Cu-containing metal, to reduce signal delay or voltage drop in the gate lines 121 and storage electrode lines 131. The other conductive layer may include a material such as a Mo-containing metal, Cr, Ti, and Ta, which has good contact characteristics with other materials such as indium tin oxide (ITO) and indium zinc oxide (IZO).

Also, the lateral sides of the gate lines 121 are inclined relative to a surface of the substrate 110, and the inclination angle thereof may range from about 30 degrees to about 80 degrees.

A gate insulating layer 140, which may include silicon nitride (SiNx), is formed on the gate lines 121 and the storage electrode lines 131.

A plurality of semiconductor islands 154a, 154b, and 154c, which may include hydrogenated amorphous silicon (abbreviated to "a-Si") or polysilicon, are formed on the gate insulating layer 140.

The semiconductor islands 154a, 154b, and 154c are respectively disposed on the first, second, and third gate electrodes 124a, 124b, and 124c. The semiconductor islands 154a and 154b make up one body as do the first and second gate electrodes 124a and 124b, and may be spaced apart according to the structure of the first and second gate electrodes 124a and 124b.

A plurality of ohmic contact islands 163a, 163b, 163c, 165a, 165b, and 165c, which may include silicide or n+ hydrogenated amorphous silicon (a-Si) heavily doped with an n-type impurity such as phosphorus (P), are formed on the semiconductor islands 154a, 154b, and 154c. The ohmic contact islands 163a, 163b, 163c, 165a, 165b, and 165c are disposed in pairs on the semiconductors 154a, 154b, and 154c, respectively.

The lateral sides of the semiconductors 154a, 154b, and 154c and the ohmic contact islands 163a, 163b, 163c, 165a, 165b, and 165c are also inclined relative to a surface of the substrate 110, and the inclination angle thereof may range from about 30 degrees to about 80 degrees.

A plurality of data lines 171 including a plurality of first and second source electrodes 173a and 173b, a plurality of first, second, and third drain electrodes 175a, 175b, and 175c, a plurality of third source electrodes 173c, a plurality of buffer electrodes 176, and a plurality of storage electrode lines 131 are formed on the ohmic contacts 163a, 163b, 163c, 165a, 165b, and 165c and the gate insulating layer 140.

The data lines 171 extend substantially in the column direction and cross the gate lines 121 and transmit data signals. Each data line 171 includes a plurality of first and second source electrodes 173a and 173b branched out toward the first and second gate electrodes 124a and 124b and an end portion 179 having an extended area to connect to another layer or an external driving circuit. The first and the second source electrodes 173a and 173b have upside down "U" shapes and are connected to each other to form an upside down "W" shape.

A data driving circuit (not shown) to generate the data signals may be mounted on an FPC film (not shown), which may be attached to the substrate 110, directly mounted on the substrate 110, or integrated with the substrate 110. The data lines 171 may extend to connect to a driving circuit that may be integrated with the substrate 110.

The first and second drain electrodes 175a and 175b are spaced apart from the data lines 171, and the drain electrodes 175a and 175b are opposite the first and second source electrodes 173a and 173b with respect to the gate electrodes 124a and 124b, respectively.

Each of the first and second drain electrodes 175a and 175b includes a stick-shaped end portion, which is partially surrounded by the source electrodes 173a and 173b that are curved in the shape of a letter "U".

Each of the first and second drain electrodes 175a and 175b includes an expansion, which is not opposite the first and second source electrodes 173a and 173b, extending to connect to another layer.

The third drain electrodes 175c and the third source electrodes 173c overlap the semiconductors 154c and are opposite each other with respect to the third gate electrodes 124c. Portions of the third drain electrodes 175c and the third source electrodes 173c extend to connect to another layer, and the third drain electrodes 175c are connected to the buffer electrodes 176.

The first, second, and third gate electrodes 124a, 124b, and 124c, the first, second, and third source electrodes 173a, 173b, and 173c, and the first, second, and third drain electrodes 175a, 175b, and 175c, along with the semiconductors 154a, 154b, and 154c, form the first, second, and third TFTs Q1, Q2, and Q3. Each TFT Q1, Q2, and Q3 has a channel formed in the semiconductors 154a, 154b, and 154c disposed between the first, second, and to third source electrodes 173a, 173b, and 173c and the first, second, and third drain electrodes 175a, 175b, and 175c, respectively.

The first source electrode 173a and the second source electrode 173b, the first gate electrode 124a and the second gate electrode 124b, and the first semiconductor 154a and the second semiconductor 154b, which form the first TFT Q1 and the second TFT Q2, may be formed spaced apart from each other.

The storage electrode lines 131 extend substantially in the column direction and are supplied with a predetermined voltage such as a common voltage, which is applied to a common electrode 270 on the common electrode panel 200 of the LCD. Each storage electrode line 131 is disposed at the central portion between neighboring data lines 171 and includes a transverse portion 137a, a first longitudinal portion 137b, an oblique portion 137c, and a second longitudinal portion 137d.

The transverse portion 137a extends parallel to the gate lines 121. The first longitudinal portion 137b is connected to the left end or right end of the transverse portion 137a and extends parallel to the data lines 171. The second longitudinal portion 137d is connected to the central portion of the transverse portion 137a and extends nearly parallel to the data lines 171 at the central portion between two neighboring data lines 171. The oblique portion 137c connects the first longitudinal portion 137b to the second longitudinal portion 137d and includes a transverse edge parallel to the gate lines 121 and an oblique edge forming the oblique angle with the gate lines 121.

The transverse portions 137a, the first longitudinal portions 137b, and the oblique portions 137c of the storage lines 131 detour around a third thin film transistor Q3 to connect two second longitudinal portions 137d. When comparing two neighboring pixels in the first direction, the first longitudinal portion 137b and the oblique portion 137c are alternatively disposed at the right and left sides with reference to the second longitudinal portion 137d. However, the shapes and the arrangements of the storage lines 131 may be changed.

In one pixel, the first and second thin film transistors Q1 and Q2 may be connected to a different gate line 121 than the third thin film transistor Q3. That is, the first and second thin film transistors Q1 and Q2 are connected to a gate line 121 that is disposed in an upper portion of the pixel region, and the third thin film transistor Q3 is connected to a gate line 121 that is disposed in a lower portion of the pixel region. Alternatively, the first and second thin film transistors Q1 and Q2 may be connected to a gate line 121 that is disposed in a lower portion of the pixel region, and the third thin film transistors Q3 may be connected to the gate lines 121 that are disposed in an upper portion of the pixel region.

When comparing two neighboring pixels in the first direction, the first and second thin film transistors Q1 and Q2 are alternately connected to the data lines 171 of the right and left sides of the pixel regions. That is, the first and second thin film transistors Q1 and Q2 are connected to the data lines 171 disposed on the left side of the pixel region in the odd pixel column, and the first and second thin film transistors Q1 and Q2 are connected to the data lines 171 disposed on the right side of the pixel region in the even pixel column. Contrarily, the first and second thin film transistors Q1 and Q2 may be connected to the data lines 171 disposed on the left side of the pixel region in the even pixel column, and the first and second thin film transistors Q1 and Q2 may be connected to the data lines 171 disposed on the right side of the pixel region in the odd pixel column.

The first and second thin film transistors Q1 and Q2 are respectively and alternately disposed on the upper corners of the right and left sides of the pixel regions, and the third thin film transistors Q3 are disposed on the lower center portion of the pixel region. The first and second thin film transistors Q1 and Q2 may be respectively and alternately disposed on the lower corners of the right and left sides of the pixel regions.

In this exemplary embodiment, the first and second thin film transistors Q1 and Q2 are alternately connected to the right and left data lines 171, and column inversion driving may be applied. Alternatively, dot inversion driving may be used.

Also, the length of the two transverse edges of a pixel that are parallel to the gate lines 121 are longer than the length of the two longitudinal edges of the pixel that are parallel to the data lines 171, as compared to a case in which the transverse edges are shorter than the longitudinal edges. For example, the two transverse edges may be substantially three times longer than the two longitudinal edges. Accordingly, the total number of data lines 171 may be decreased by one-third and the number of gate lines 121 may be increased by three times, such that the time given to each gate line 121 during the horizontal period 1H is one-third of that when the transverse edges are shorter than the longitudinal edges. The column inversion should maintain the same polarity of the data lines 171 while one frame is driven. However, when the column inversion is simply driven, cross-talk in the vertical direction may be increased. In this exemplary embodiment, to solve this problem, the first and second thin film transistors Q1 and Q2 are alternately connected to the right and left data lines 171.

Furthermore, in this exemplary embodiment, the third thin film transistors Q3 are disposed on the right and left center portions of the pixel region and the storage lines 131 detouring around the circumference of the third thin film transistors Q3 extend in a column direction to minimize the reduction of the aperture ratio of the pixels.

The data lines 171, the first, second, and third drain electrodes 175a, 175b, and 175c, the third source electrodes 173c, the buffer electrodes 176, and the storage electrode lines 131 may include a refractory metal such as Mo, Cr, Ta, and Ti, or alloys thereof, and they may have a multi-layered structure including a refractory metal layer (not shown) and a conductive layer (not shown) having low resistivity. However, the data lines 171, the first, second, and third drain electrodes 175a, 175b, and 175c, the third source electrode 173c, the buffer electrode 176, and the storage electrode line 131 may include various metals or conductive materials besides the above.

The lateral sides of the data lines 171, the first, second, and third drain electrodes 175a, 175b, and 175c, the third source electrodes 173c, the buffer electrodes 176, and the storage electrode lines 131 are also inclined relative to a surface of the substrate 110, and the inclination angles thereof may be in a range of about 30 degrees to about 80 degrees.

The ohmic contacts 163a, 163b, 163c, 165a, 165b, and 165c are interposed between the underlying semiconductors 154a and 154b and the overlying data lines 171, source electrodes 173a, 173b, and 173c, and drain electrode 175a, 175b, and 175c thereon, and may reduce the contact resistance therebetween. The semiconductors 154a, 154b, and 154c include some exposed portions that are not covered with the data lines 171 and the drain electrodes 175a, 175b, and 175c, such as portions located between the source electrodes 173a, 173b, and 173c, and the drain electrodes 175a, 175b, and 175c.

A passivation layer 180 is formed on the data lines 171, the first, second, and third drain electrodes 175a, 175b, and 175c, the third source electrodes 173c, the buffer electrodes 176, and the storage electrode lines 131, and the exposed portions of the semiconductors 154a, 154b, and 154c. The passivation layer 180 may include an inorganic insulator such as silicon nitride or silicon oxide, an organic insulator, or a low dielectric insulator. The organic insulator and the low dielectric insulator may have dielectric constants that are lower than 4.0. The passivation layer 180 may include an organic insulator having photosensitivity and the surface thereof may be flat. However, the passivation layer 180 may have a double-layered structure including a lower inorganic layer and an upper organic layer, which may protect the exposed portions of the semiconductors 154a, 154b, and 154c while making the most of the excellent insulating characteristics of an organic layer.

The passivation layer 180 has a plurality of contact holes 182, 185a, 185b, 185c, and 183 that respectively expose the end portions 179 of the data lines 171, the first, second, and third drain electrodes 175a, 175b, and 175c, and the third source electrodes 173c.

A plurality of pixel electrodes 191, a plurality of contact assistants 82, and a plurality of capacitive conductors 86 are formed on the passivation layer 180. These may include a transparent conductor such as ITO or IZO, or a reflective metal such as Al, Ag, Cr, or alloys thereof.

Each pixel electrode 191 has four major edges, which are each substantially parallel to the gate lines 121 or the data lines 171, and four chamfered corners. Among these edges, the length of the two transverse edges that are parallel to the gate lines 121 is longer than the two longitudinal edges that are parallel to the data lines 171. For example, the length of the two transverse edges may be substantially three times longer than the two longitudinal edges.

Consequently, as compared to the case in which the transverse edges are shorter than the longitudinal edges, fewer pixel electrodes 191 are located in each row and more pixel electrodes 191 are located in each column. Accordingly, since there may be fewer data lines 171, the material costs may be reduced because fewer IC chips are needed for the data driver 500. Even though more gate lines 121 are used, since the gate drivers 400 can be integrated into the assembly 300 along with the gate lines 121, data lines 171, and the TFTs, this is not a substantial problem. Moreover, even if the gate drivers 400 are mounted in the form of IC chips, it may be more advantageous to use fewer IC chips for the data driver 500 because the cost of the IC chips for the gate drivers 400 is relatively low.

Each pixel electrode 191 includes a first and a second sub-pixel electrode 191a and 191b that are spaced apart from each other with a gap 94 therebetween.

The first sub-pixel electrode 191a includes first, second, and third portions 191a1, 191a2, and 191a3, which are respectively disposed on the upward, leftward, and downward sides of the second sub-pixel electrode 191b, and connections connecting the third portion 191a1 to the first and second portions 191a1 and 191a2. Because the second sub-pixel electrodes 191b are disposed in the central spaces made by the first, second, and third portions 191a1, 191a2, and 191a3, the edges, other than those close to the gate lines 121, are enclosed by the first sub-pixel electrodes 191a.

Portions at which a gap 91 exists between the first, second, and third portions 191a1, 191a2, and 191a3 of the first sub-pixel electrode 191a and the second sub-pixel electrode 191b form an oblique angle with the gate line 121. Their acute angle with the gate line 121 may be about 45 degrees. Also, portions of the gap 91 that are disposed between the connection portions of the first sub-pixel electrode 191a and the second sub-pixel electrode 191b are parallel to the gate lines 121.

The first and second portions 191a1 and 191a2 include cutouts 92 that make oblique angles with the gate lines 121 and are parallel to the gaps 91. The third portions 191a3 of the first sub-pixel electrode 191*a* are interposed in the depression portions of the second sub-pixel electrodes 191*b*.

The second sub-pixel electrode 191*b* includes a longitudinal cutout 93 having an inlet sloping downward and overlapping the second longitudinal portion 137*d* of the storage electrode line 131. The inlet of the longitudinal cutout 93 is connected to the gap 91. The first and second portions 191*a*1 and 191*a*2 of the first sub-pixel electrode 191*a* and the second sub-pixel electrodes 191*b* are substantially inversely symmetrical with respect to the central line between the right and left data lines 171.

Therefore, the right half and the left half of the pixel electrode 191 is partitioned into a plurality of regions by the gap 91 (for convenience, the gap 91 is called a "cutout" hereinafter) and the cutouts 92 and 93. Here, the number of regions and the number of cutouts may vary according to the size of a pixel, the ratio of the transverse and longitudinal edges of the pixel electrode, the type or characteristics of the LC layer 3, or other design factors.

The first and second sub-pixel electrodes 191*a* and 191*b* are connected to the first and second drain electrodes 175*a* and 175*b* through the contact holes 185*a* and 185*b* and are supplied with a data voltage from the first and second drain electrodes 175*a* and 175*b*, respectively.

The sub-pixel electrodes 191*a* and 191*b* supplied with data voltages generate electric fields in cooperation with the common electrode 270 so that the orientations of the LC molecules in the LC layer 3 interposed between the sub-pixel electrodes 191*a* and 191*b* and the common electrode 270 may be adjusted.

Also, as described above, each sub-pixel electrode 191*a* and 191*b* forms an LC capacitor Clca or Clcb with the common electrode 270 to store the applied voltages even after the TFTs Qa and Qb are turned off.

Also, the pixel electrode 191 overlaps a storage electrode line 131 to form storage capacitors Csta and Cstb, which are connected in parallel to the LC capacitors Clca and Clcb to enhance the voltage storing capacity thereof.

The first sub-pixel electrodes 191*a* are connected to the third source electrodes 173*c* through the contact holes 183.

The second sub-pixel electrodes 191*b* overlap the buffer electrodes 176 to form a capacitor Cu to raise the voltage. Here, the buffer electrodes 176 may be omitted.

The capacitive conductors 86 are disposed in the depression portions of the third portions 191*a*3 of the first sub-pixel electrodes 191*a* by the gap 94 and are connected to the third drain electrode 175*c* through the contact holes 185*c*. The capacitive conductors 86 overlap the longitudinal portion 137*b* of the storage electrode line 131 to form a capacitor Cu to reduce the voltage.

The contact assistants 82 are connected to the end portions 179 of the data lines 171 through the contact holes 182, respectively. The contact assistants 82 may aid the adhesion of the exposed end portions 179 of the data lines 171 to external apparatuses and protect these end portions 179.

Next, the upper panel 200 will be described with reference to FIG. 3 and FIG. 5, FIG. 6, FIG. 7, and FIG. 8.

A light blocking member 220 having a plurality of openings is formed on an insulating substrate 210 that may include transparent glass or plastic. The light blocking member 220 is also called a black matrix and prevents light leakage. The light blocking member 220 includes linear portions corresponding to the data lines 171 and the gate lines 121 and planar portions corresponding to the TFTs, and it prevents light leakage between pixel electrodes 191 and defines openings that face the pixel electrodes 191.

A plurality of color filters 230 is also formed on the substrate 210. The color filters 230 are disposed substantially in the areas enclosed by the light blocking member 220, and they may extend in a column direction substantially along the pixel electrodes 191. Each color filter 230 may represent one of the primary colors such as red, green, and blue.

An overcoat 250 is formed on the color filters 230 and the light blocking member 220. The overcoat 250 may include an (organic) insulator and may prevent the color filters 230 from being exposed while providing a flat surface. The overcoat 250 may be omitted.

A common electrode 270 is formed on the overcoat 250. The common electrode 270 may include a transparent conductive material such as ITO and IZO.

The common electrode 270 has a plurality of sets of cutouts 71, 72, 73*a*, 73*b*, 74*a*, and 74*b*.

A set of cutouts 71, 72, 73*a*, 73*b*, 74*a*, and 74*b* faces a pixel electrode 191 and includes first and second center cutouts 71 and 72, left cutouts 73*a* and 74*a*, and right cutouts 73*b* and 74*b*. Each of the cutouts 71, 72, 73*a*, 73*b*, 74*a*, and 74*b* is disposed between adjacent cutouts 91-93 of the pixel electrode 191.

Each first center cutout 71 includes a pair of oblique branches, a pair of terminal transverse branches, and a longitudinal portion parallel to the data lines 171. The oblique branches extend approximately from the lower edges of the pixel electrode 191 to the storage electrode lines 131 and are connected to the longitudinal portion.

Each second center cutout 72 includes a pair of oblique branches and a pair of terminal transverse branches. The pair of oblique branches is parallel to the pair of oblique branches of the first center cutouts 71.

Each right and left cutout 73*a*, 73*b*, 74*a*, and 74*b* includes an oblique branch, a transverse branch, and a longitudinal branch. These oblique branches extend from both side edges of the pixel electrode 191 to the central part of the pixel electrode 191 substantially parallel to the oblique branches of the first and second center cutouts 71 and 72. Each transverse branch and the longitudinal branch extends from a respective end of the oblique branch along the edges of the pixel electrode 191, overlapping the edges of the pixel electrode 191 and making obtuse angles with the oblique branch.

Each oblique portion of the cutouts 71, 72, 73*a*, 73*b*, 74*a*, and –74*b* has triangular notches. Each notch may have the shape of a quadrangle, a trapezoid, or a semicircle, and may be convex or concave. The notches determine the tilt directions of the LC molecules on the region boundaries corresponding to the cutouts 71, 72, 73*a*, 73*b*, 74*a*, and 74*b*.

The number or direction of the cutouts 71, 72, 73*a*, 73*b*, 74*a*, and 74*b* may also vary depending on design factors.

At least one of the cutouts 71, 72, 73*a*, 73*b*, 74*a*, and 74*b* may be substituted with protrusions or depressions, and the shapes and the arrangements of the cutouts 71, 72, 73*a*, 73*b*, 74*a*, and 74*b* may be modified.

Alignment layers 11 and 21 are coated on inner surfaces of the panels 100 and 200. The alignment layers 11 and 12 may be homeotropic.

Polarizers 12 and 22 are provided on outer surfaces of the panels 100 and 200. The polarization axes of the polarizers may be perpendicular to each other, and one of the polarization axes may be parallel to the gate lines 121. One of the polarizers may be omitted when the LCD is a reflective LCD.

The LCD may further include at least one retardation film (not shown) to compensate the retardation of the LC layer 3. The retardation film has birefringence and retards opposite to the LC layer 3. The retardation film may include a uniaxial or biaxial optical compensation film and in particular, may include a negative uniaxial compensation film.

The LCD may further include a backlight unit (not shown) to supply light to the LC layer 3 through the polarizer 1, the retardation film, and the panel 100.

The LC layer 3 may have negative dielectric anisotropy and may be subjected to vertical alignment such that the LC molecules in the LC layer 3 are aligned with their long axes substantially perpendicular to the surfaces of the panels 100 and 200 in the absence of an electric field.

The cutouts 91, 92, and 93 of the pixel electrodes 191, the cutouts 71, 72, 73a, 73b, 74a, and 74b of the common electrode 270, and the oblique edges of the pixel electrodes 191 that are parallel to those cutouts 91, 92, and 93 and 71, 72, 73a, 73b, 74a, and 74b distort the electric field to create a horizontal component that determines the tilt directions of the LC molecules. The horizontal component of the electric field is perpendicular to the oblique edges of the cutouts 91, 92, and 93 and 71, 72, 73a, 73b, 74a, and 74b and the oblique edges of the pixel electrodes 191.

A set of common electrode cutouts 71, 72, 73a, 73b, 74a, and 74b and a set of pixel electrode cutouts 91, 92, and 93 divide a pixel electrode 191 into a plurality of sub-areas, and each sub-area has two major edges that make oblique angles with the primary edges of the pixel electrode 191. Since the LC molecules in each sub-area tilt to be perpendicular to the major edges, the azimuthal distribution of the tilt directions is localized to four directions. In this way, the reference viewing angle of the LCD may be increased by providing for various tilt directions of the LC molecules.

Now, the operation of the LCDs according to exemplary embodiments of the present invention will be described in detail with reference to the accompanying drawings.

Figure 9:
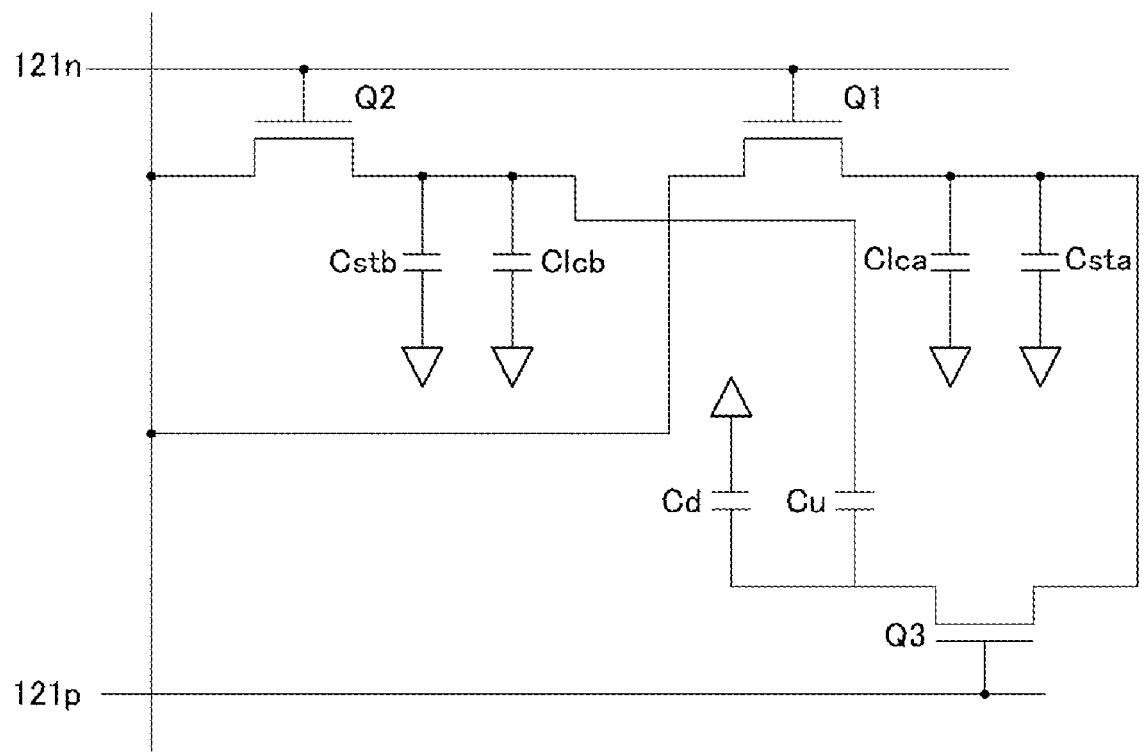
FIG. 9 is an equivalent circuit diagram of one pixel of an LCD according to an exemplary embodiment of the present invention.

FIG. 9 is an equivalent circuit diagram of one pixel of an LCD according to an exemplary embodiment of the present invention.

As shown in FIG. 9, a pixel of the LCD according to an exemplary embodiment of the present invention includes a first thin film transistor Q1, a first liquid crystal capacitor Clca, a first storage capacitor Csta, a second thin film transistor Q2, a second liquid crystal capacitor Clcb, a second storage capacitor Cstb, a third thin film transistor Q3, a voltage reducing capacitor Cd, and a voltage increasing capacitor Cu.

For convenience of the description, reference numeral 121n indicates a gate line of a current row n, and a reference numeral 121p indicates a gate line of a following row (n+1).

A control terminal, an input terminal, and an output terminal of the first thin film transistor Q1 are respectively connected to the current gate line 121n, the data line 171, and the first sub-pixel electrode 191a, and a control terminal, an input terminal, and an output terminal of the second thin film transistor Q2 are respectively connected to the current gate line 121n, the data line 171, and the second sub-pixel electrode 191b. A control terminal, an input terminal, and an output terminal of the third thin film transistor Q3 are respectively connected to the following gate line 121p, the first sub-pixel electrode 191a and a capacitive conductor 86, and a buffer electrode 176.

The first liquid crystal capacitor Clca includes the first sub-pixel electrode 191a and the common electrode 270 as two terminals and the liquid crystal layer 3 disposed therebetween as a dielectric, and the second liquid crystal capacitor Clcb includes the second sub-pixel electrode 191b and the common electrode 270 as two terminals and the liquid crystal layer 3 disposed therebetween as a dielectric.

The voltage reducing capacitor Cd includes the capacitive conductor 86 connected to the drain electrode 175c of the third thin film transistor Q3 and the storage electrode line 131 as two terminals and a passivation layer 180 disposed therebetween as a dielectric, and the voltage increasing capacitor Cu includes the second sub-pixel electrode 191b and the buffer electrode line 176 as two terminals and a passivation layer 180 disposed therebetween as a dielectric.

Now, frame inversion driving will be described in the following.

Firstly, the first and second thin film transistors Q1 and Q2 are turned on according to the gate signal applied to the gate line 121n of the current row such that the data voltage applied to the data line 171 is transmitted to the first and second sub-pixel electrodes 191a and 191b. Accordingly, the data voltage is charged to the first and second liquid crystal capacitors Clca and Clcb and the first and second storage capacitors Csta and Cstb.

Secondly, the third thin film transistor Q3 is turned on according to the gate signal applied to the gate line 121p of the following row such that the portions of the electric charges charged in the first liquid crystal capacitor Clca and the first storage capacitor Csta move via the third thin film transistor Q3, and then the voltage reducing capacitor Cd and the voltage increasing capacitor Cu may be charged.

At this time, because electric charges of opposite polarity are charged to the voltage reducing capacitor Cd and the voltage increasing capacitor Cu, if the third thin film transistor Q3 is turned on, the voltages charged to the first liquid crystal capacitor Clca and the first storage capacitor Csta may be reduced due to the dispersion of the electric charges.

The second sub-pixel electrode 191b, which is one terminal of the voltage increasing capacitor Cu, may be floated when the third thin film transistor Q3 is turned on. Accordingly, the electric charges of the same polarity as the electric charges charged in the second sub-electrode 191b may flow into the buffer electrode 176, which is the other terminal of the voltage increasing capacitor Cu, such that the voltages of the second sub-pixel electrode 191b and the second storage capacitor Cstb may be increased according to the increasing of the voltage of the buffer electrode 176.

When the buffer electrode 176 is omitted, the voltage increasing capacitor is not formed so the voltages of the second sub-pixel electrode 191b and the second storage capacitor Cstb may not increase.

Accordingly, the voltages Va and Vb firstly charged in the first and second liquid crystal capacitors Clca and Clcb are the same if the third film transistor Q3 is turned off, and the voltages Va and Vb charged in the first and second liquid crystal capacitors Clca and Clcb are different if the third thin film transistor Q3 is turned on.

When the voltages are charged in the first and second liquid crystal capacitors Clca and Clcb, an electric field is generated in the LC layer 3. Then, the LC molecules in the LC layer 3 tilt in response to the electric field such that their long axes become perpendicular to the field direction. The tilt of the LC molecules determines the variation of the polarization of light incident on the LC layer 3, and the variation of the light polarization is transformed into the variation of the light transmittance by the polarizers 12 and 22. In this way, the LCD may display images.

The tilt angle of the LC molecules depends on the strength of the electric field. Since the voltage Va of the first liquid crystal capacitor Clca and the voltage Vb of the second liquid crystal capacitor Clcb are different from each other, the tilt direction of the LC molecules in the first sub-pixel is different from that in the second sub-pixel and thus, the luminance of the two sub-pixels is different. Accordingly, while maintaining the average luminance of the two sub-pixels at a target luminance, the voltages Va and Vb of the first and second sub-pixels may be adjusted so that the quality of an image viewed from a lateral side is close to that of an image viewed from the front, thereby improving the lateral visibility.

Also, if the electric charges charged in the pixel electrode 191 are not sufficiently discharged and a portion of the charges remains after displaying images in the corresponding frame, an afterimage may be noticed on the screen. Because the electric charges charged in the first sub-pixel electrode 191a are discharged through the first thin film transistor Q1, these charges do not contribute to an afterimage. However, because the discharge path of the electric charges charged in the second sub-pixel electrode, which is floated, is only through the liquid crystal layer, an afterimage may be generated. When a second thin film transistor connected to the second sub-pixel electrode is provided, as in exemplary embodiments of the present invention, the electric charges charged in the second sub-pixel electrode 191b may be discharged through the second thin film transistor Q2 and the generation of the afterimages may be prevented.

Embodiment 2

Figure 10:
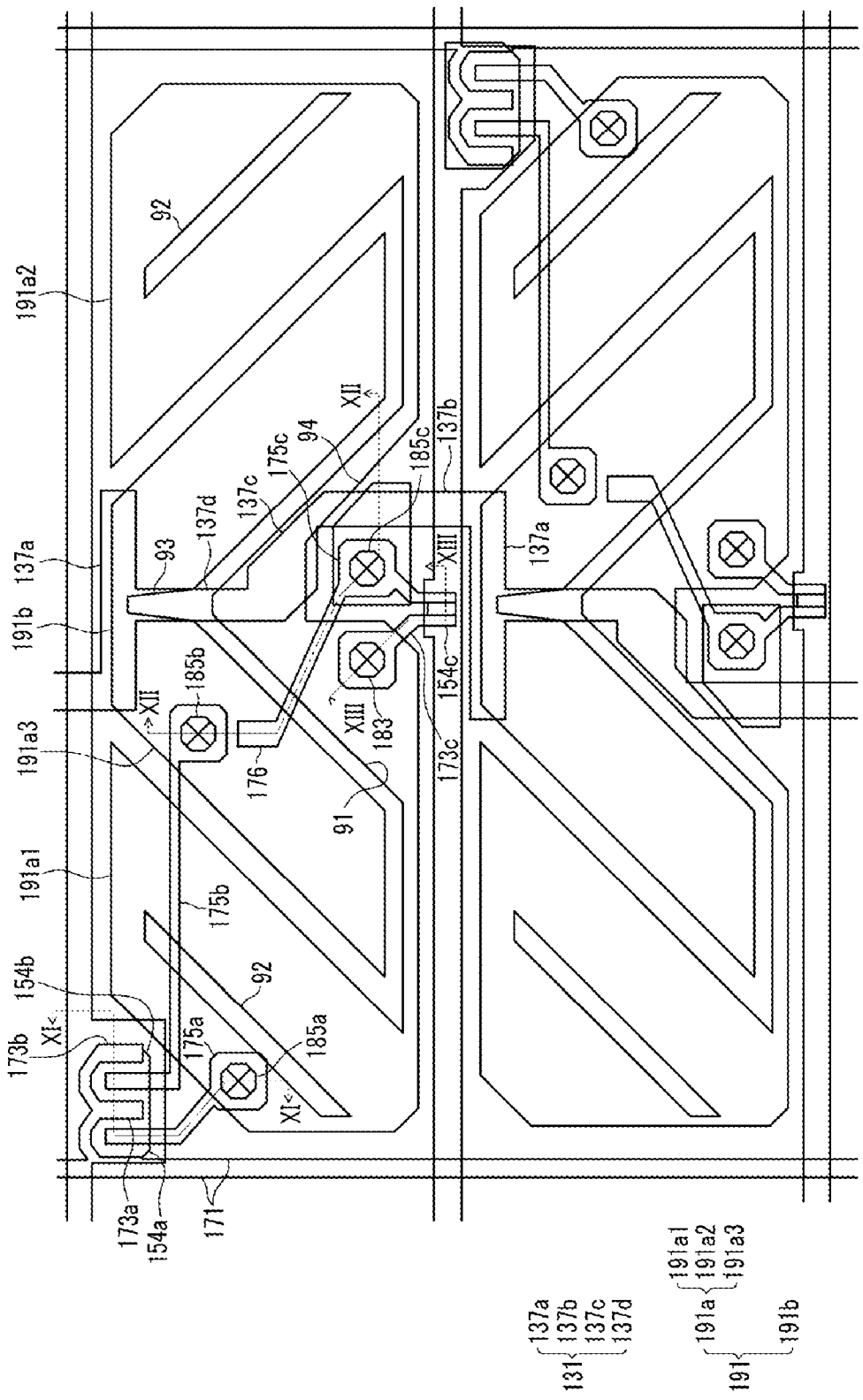
FIG. 10 is a layout view of an LCD according to an exemplary embodiment of the present invention.
Figure 11:
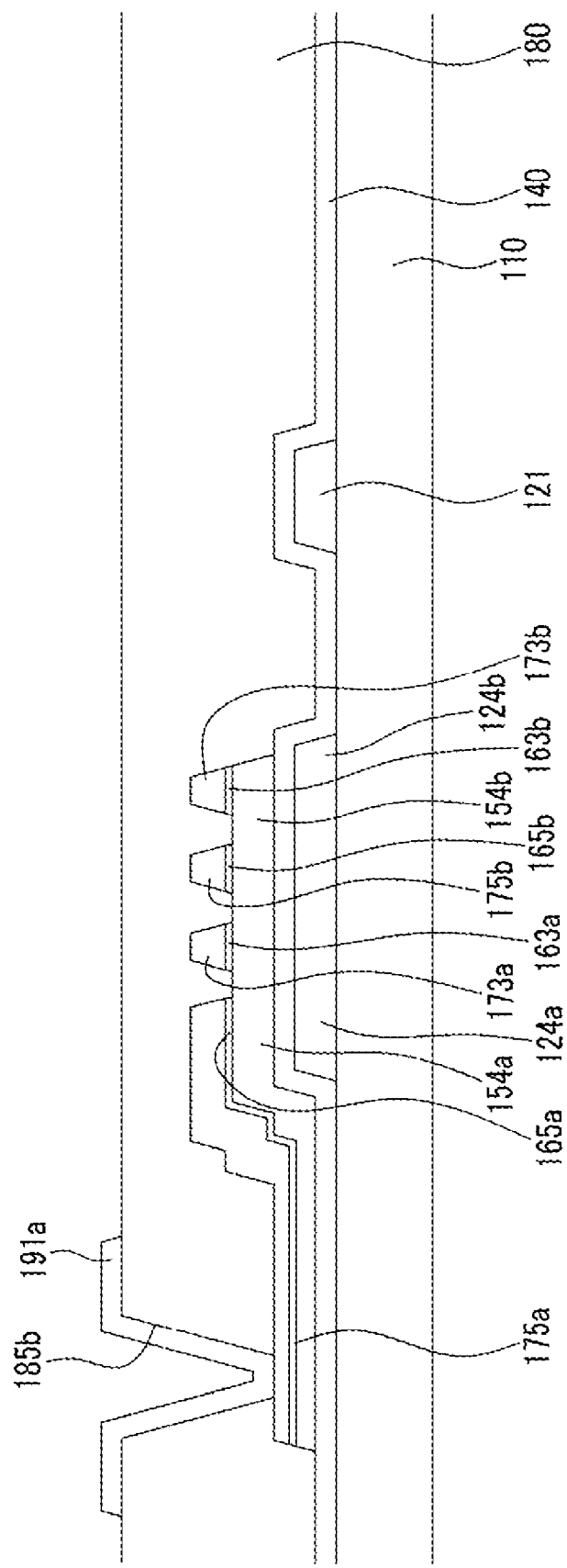
FIG. 11, FIG. 12, and FIG. 13 are cross-sectional views of the LCD shown in FIG. 10 taken along line XI-XI, line XII-XII, and line XIII-XIII.
Figure 12:
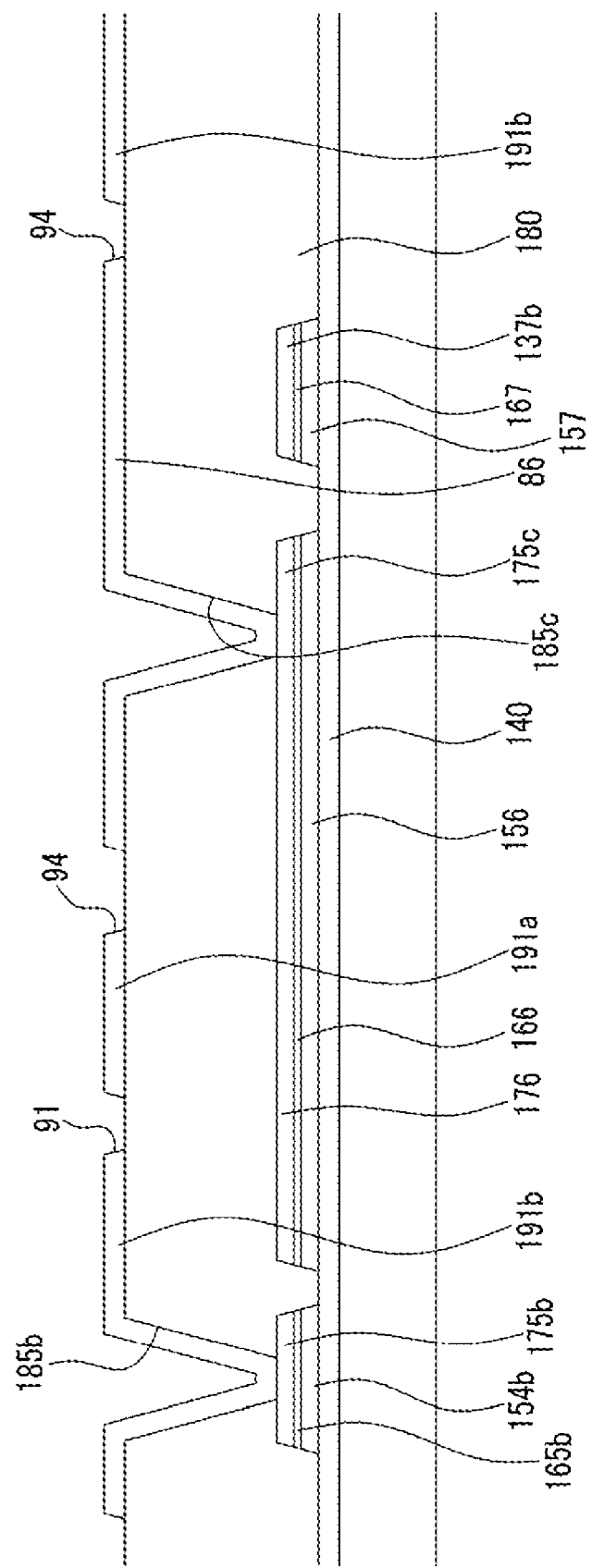
Figure 13:
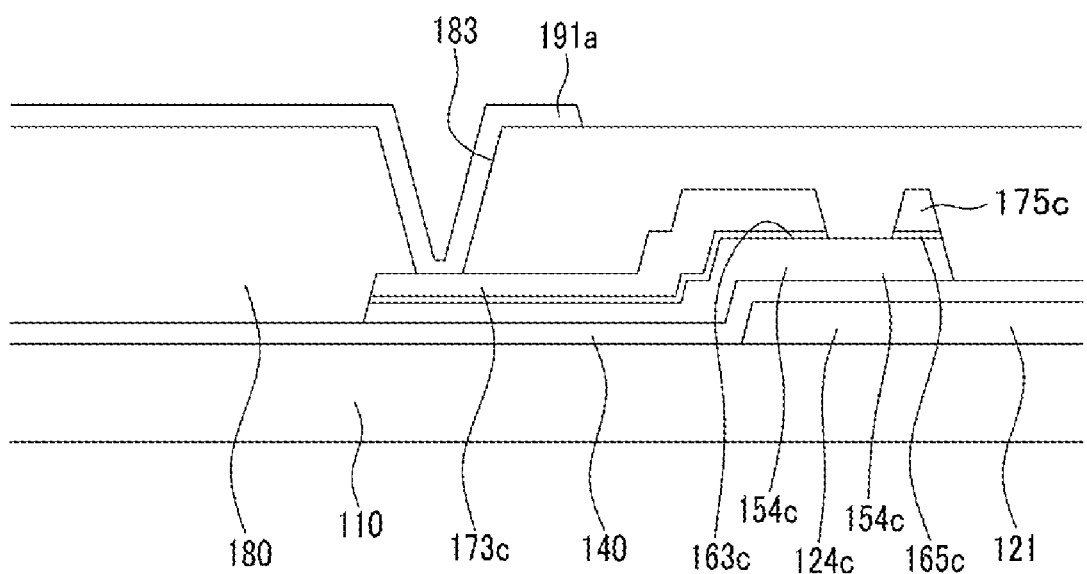

FIG. 10 is a layout view of an LCD according to an exemplary embodiment of the present invention, and FIG. 11, FIG. 12, and FIG. 13 are cross-sectional views of the LCD shown in FIG. 10 taken along line XI-XI, line XII-XII, and line XIII-XIII.

Because the structure of the thin film transistor panel according to this exemplary embodiment is similar to that of FIG. 3, FIG. 4, FIG. 5, FIG. 6, FIG. 7, and FIG. 8, a description of the same structures is omitted and only different portions are explained in the following.

Unlike the LCD shown in FIG. 3, FIG. 4, FIG. 5, FIG. 6, FIG. 7, and FIG. 8, the semiconductors 154a, 154b, 154c, 156, and 157 and the ohmic contacts 163a, 163b, 163c, 165a, 165b, 165c, 166, and 167 in this exemplary embodiment extend under the whole portion of the data lines 171, the source electrodes 173a, 173b, and 173c, the drain electrodes 175a, 175b, and 175c, the storage electrode lines 131, and the buffer electrodes 176. In addition, the semiconductors 154a, 154b, 154c, 156, and 157 have almost the same planar shapes as the data lines 171, the source electrodes 173a, 173b, and 173c, the drain electrodes 175a, 175b, and 175c, the storage electrode lines 131, and the buffer electrodes 176 as well as the underlying ohmic contacts 163a, 163b, 163c, 165a, 165b, 165c, 166, and 167. However, the semiconductors 154a, 154b, 154c, 156, and 157 further include some portions in which the channels of the thin film transistors Q1, Q2, and Q3 are formed.

A method of manufacturing a thin film transistor array panel according to this exemplary embodiment includes simultaneously forming the data lines, the drain electrodes, the semiconductors, and the ohmic contacts with one photolithography step using a photoresist pattern having position-dependent thickness. The photoresist pattern may be obtained by an exposure mask having a slit pattern, a lattice pattern, or a thin film(s) with intermediate transmittance or intermediate thickness and a reflowing process.

Accordingly, the semiconductors 156 and 157 and the ohmic contacts 166 and 167 are formed under the storage electrode lines 131 and the buffer electrode 176 with the same planar shapes.

In this exemplary embodiment according to the present invention, the storage electrode lines 131 may be formed from the same layer as the data lines 171 so that electric charges are not trapped by the semiconductors and a change of electrostatic capacitance is not generated. Accordingly, because the semiconductors are not formed between the storage electrode line 131 and the pixel electrode 191, even if a direct current is applied, the electric charges are not trapped.

A light blocking member that is disposed on a portion corresponding to the semiconductors may be added to reduce light leakage current of the semiconductor due to light from a backlight. The light blocking member may be made from the same layer and material as the gate lines 121.

According to exemplary embodiments of the present invention, the two sub-pixel electrodes are respectively connected to the thin film transistors such that the electric charges of the sub-pixels may be easily and quickly discharged. Accordingly, an afterimage may be prevented. Furthermore, different voltages are applied to the plurality of sub-pixels such that the lateral visibility may be improved.

According to exemplary embodiments of the present invention, pixels having long transverse edges are arranged, such that fewer data drivers may be used, thereby decreasing manufacturing costs.

Also, the thin film transistors are alternately connected to the left and right data lines such that cross-talk may be prevented in LCDs employing a frame inversion driving method.

Furthermore, thin film transistors are disposed on the central portions of the pixel region, and the storage lines detour around the circumference of the third thin film transistors and extend in a column direction such that the aperture ratio of the pixels may be maximized.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a substrate;
   a first gate line, a second gate line, and a third gate line formed on the substrate adjacent to each other;
   a first data line and a second data line adjacent to each other and insulated from and crossing the first gate line, the second gate line, and the third gate line;
   a storage electrode line insulated from and crossing the first gate line, the second gate line, and the third gate line;
   a first thin film transistor comprising a control terminal connected to the first gate line and an input terminal connected to the first data line;
   a second thin film transistor comprising a control terminal connected to the first gate line and an input terminal connected to the first data line;
   a first sub-pixel electrode connected to the output terminal of the first thin film transistor;
   a second sub-pixel electrode connected to the output terminal of the second thin film transistor;
   a third thin film transistor comprising a control terminal connected to the second gate line and an input terminal connected to the first sub-pixel electrode;
   a first capacitive conductor connected to the output terminal of the third thin film transistor, the first capacitive conductor being formed from the same layer as the first sub-pixel electrode and the second sub-pixel electrode and overlapping a portion of the storage electrode line to form a first voltage reducing capacitor;

a first buffer electrode connected to the output terminal of the third thin film transistor and overlapping the portion of the second sub-pixel electrode to form a first voltage increasing capacitor;

a fourth thin film transistor comprising a control terminal connected to the second gate line and an input terminal connected to the second data line;

a fifth thin film transistor comprising a control terminal connected to the second gate line and an input terminal connected to the second data line;

a third sub-pixel electrode connected to the output terminal of the fourth thin film transistor;

a fourth sub-pixel electrode connected to the output terminal of the fifth thin film transistor;

a sixth thin film transistor comprising a control terminal connected to the third gate line and an input terminal connected to the third sub-pixel electrode;

a second capacitive conductor connected to the output terminal of the sixth thin film transistor, the second capacitive conductor being formed from the same layer as the third sub-pixel electrode and the fourth sub-pixel electrode and overlapping a portion of the storage electrode line to form a second voltage reducing capacitor; and a second buffer electrode connected to the output terminal of the sixth thin film transistor and overlapping a portion of the fourth sub-pixel electrode to form a second voltage increasing capacitor, wherein the storage electrode line includes a first portion disposed at equal distances from the first data line and the second data line, a second portion connected to the first portion and detouring around the right side of the third thin film transistor, and a third portion connected to the first portion and detouring around the left side of the sixth thin film transistor, and wherein an interval between the first data line and the second data line is wider than an interval between the first gate line and the second gate line.

2. A liquid crystal display, comprising:
a substrate;
a first gate line and a second gate line disposed on the substrate adjacent each other;
a first data line and a second data line adjacent to each other and insulated from and crossing the first gate line and the second gate line;
a storage electrode line insulated from and crossing the first gate line and the second gate line;
a first thin film transistor comprising a control terminal connected to the first gate line and an input terminal connected to the first data line;
a second thin film transistor comprising a control terminal connected to the first gate line and an input terminal connected to the first data line;
a first sub-pixel electrode connected to the output terminal of the first thin film transistor;
a second sub-pixel electrode connected to the output terminal of the second thin film transistor;
a third thin film transistor comprising a control terminal connected to the second gate line and an input terminal connected to the first sub-pixel electrode; and
a first capacitive conductor connected to the output terminal of the third thin film transistor and overlapping a portion of the storage electrode line to form a first voltage reducing capacitor.

3. The liquid crystal display of claim 2, wherein the first capacitive conductor is formed with the same layer as the first sub-pixel electrode and the second sub-pixel electrode.

4. The liquid crystal display of claim 3, further comprising:
a first buffer electrode connected to the output terminal of the third thin film transistor and overlapping a portion of the second sub-pixel electrode to form a voltage increasing capacitor.

5. The liquid crystal display of claim 4, wherein the first buffer electrode extends from the output terminal of the third thin film transistor.

6. The liquid crystal display of claim 2, wherein the storage electrode line comprises:
a first portion disposed at equal distances from the first data line and the second data line, and
a second portion connected to the first portion and detouring around the circumference of the third thin film transistor.

7. The liquid crystal display of claim 2, wherein an interval between the first data line and the second data line is wider than an interval between the first gate line and the second gate line.

8. The liquid crystal display of claim 2, wherein the input terminal and the control terminal of the first thin film transistor are respectively connected to the input terminal and the control terminal of the second thin film transistor.

9. The liquid crystal display of claim 2, further comprising:
a third gate line neighboring the second gate line;
a fourth thin film transistor comprising a control terminal connected to the second gate line and an input terminal connected to the second data line;
a fifth thin film transistor comprising a control terminal connected to the second gate line and an input terminal connected to the second data line;
a third sub-pixel electrode connected to the output terminal of the fourth thin film transistor;
a fourth sub-pixel electrode connected to the output terminal of the fifth thin film transistor;
a sixth thin film transistor comprising a control terminal connected to the third gate line and an input terminal connected to the third sub-pixel electrode; and
a second capacitive conductor connected to the output terminal of the sixth thin film transistor, the second capacitive conductor being formed from the same layer as the third sub-pixel electrode and the fourth sub-pixel electrode and at least overlapping a portion of the storage electrode line to form a second voltage reducing capacitor.

10. The liquid crystal display of claim 9, further comprising:
a first buffer electrode connected to the output terminal of the third thin film transistor and overlapping a portion of the second sub-pixel electrode to form a first voltage increasing capacitor; and
a second buffer electrode connected to the output terminal of the sixth thin film transistor and overlapping a portion of the fourth sub-pixel electrode to form a second voltage increasing capacitor.

11. The liquid crystal display of claim 9, wherein the storage electrode line comprises:
a first portion disposed at equal distances from the first data line and the second data line,
a second portion connected to the first portion and detouring around the circumference of the third thin film transistor, the second portion being between the third thin film transistor and the second data line, and
a third portion detouring around the sixth thin film transistor, the third portion being between the sixth thin film transistor and the first data line.

12. The liquid crystal display of claim 9, wherein the input terminal and the control terminal of the fourth thin film transistor are respectively connected to the input terminal and the control terminal of the fifth thin film transistor.

13. The liquid crystal display of claim 2, wherein the first sub-pixel electrode comprises:
a first portion, a second portion, and a third portion respectively disposed on a left side, a right side, and a lower side of the second sub-pixel electrode, and
connections respectively connecting the third portion to the first portion and the second portion,
wherein the second sub-pixel electrode is disposed in a central space made by the first portion, the second portion, and the third portion of the first sub-pixel electrode, and
wherein a gap between the first portion, the second portion, and the third portion of the first sub-pixel electrode and the second sub-pixel electrode forms an oblique angle with the gate line and a gap between the connections of the first sub-pixel electrode and the second sub-pixel electrode is parallel to the gate line.

14. The liquid crystal display of claim 13, wherein the first portion, the second portion, and the third portion of the first sub-pixel electrode comprise cutouts forming an oblique angle with the gate line, and the second sub-pixel electrode comprises a cutout parallel to the first data line and the second data line and overlapping the storage electrode line.

15. The liquid crystal display of claim 14, wherein the third portion of the first sub-pixel electrode includes a concave portion, and the first capacitive conductor is disposed in the concave portion of the first sub-pixel electrode.

16. The liquid crystal display of claim 14, wherein the oblique angle is about 45 degrees.

17. A liquid crystal display, comprising:
a substrate;
a first gate line disposed on the substrate and including a first gate electrode and a second gate electrode;
a second gate line comprising a third gate electrode and neighboring the first gate line;
a gate insulating layer covering the first gate line and the second gate line;
a first semiconductor, a second semiconductor, and a third semiconductor disposed on the gate insulating layer and respectively disposed on the first gate electrode, the second gate electrode, and the third gate electrode;
a data line disposed on the gate insulating layer and crossing the first gate line and the second gate line,
a first source electrode and a second source electrode respectively disposed on the first semiconductor and the second semiconductor;
a third source electrode disposed on the gate insulating layer and disposed on the third semiconductor;
a first drain electrode facing the first source electrode on the first semiconductor;
a second drain electrode facing the second source electrode on the second semiconductor;
a third drain electrode facing the third source electrode on the third semiconductor;
a storage electrode line disposed on the gate insulating layer and crossing the first gate line and the second gate line;
a plurality of ohmic contacts disposed between the first source electrode, the second source electrode, and the third source electrode and the first semiconductor, the second semiconductor, and the third semiconductors, and the first drain electrode, the second drain electrode, and the third drain electrode and the first semiconductor, the second semiconductor, and the third semiconductor;
a passivation layer covering the data line, the third source electrode, the first drain electrode, the second drain electrode, the third drain electrode, and the storage electrode line, and comprising a first contact hole, a second contact hole, a third contact hole, and a fourth contact hole respectively exposing the third source electrode, the first drain electrode, the second drain electrode, and the third drain electrode;
a first sub-pixel electrode disposed on the passivation layer and respectively connected to the third source electrode and the first drain electrode through the first contact hole and the second contact hole;
a second sub-pixel electrode disposed on the passivation layer and connected to the second drain electrode through the third contact hole; and
a capacitive conductor disposed on the passivation layer, connected to the third drain electrode through the fourth contact hole, and overlapping a portion of the storage electrode line.

18. The liquid crystal display of claim 17, further comprising a buffer electrode extending from the third drain electrode and overlapping the second sub-pixel electrode.

19. The liquid crystal display of claim 18, wherein the data line, the third source electrode, the first drain electrode, the second drain electrode, the third drain electrode, the storage electrode line, and the buffer electrode have substantially the same plane shape as the ohmic contacts.

20. The liquid crystal display of claim 19, further comprising:
a first semiconductor strip connected to the first semiconductor and the second semiconductor and disposed under the data line;
a second semiconductor strip disposed under the storage electrode line; and
a semiconductor island disposed under the third source electrode, the third drain electrode, and the buffer electrode and connected to the third semiconductor.

21. The liquid crystal display of claim 20, wherein the first semiconductor strip has substantially the same shape as the data line, the second semiconductor strip has substantially the same shape as the storage electrode line, and the semiconductor island has substantially the same shape as the buffer electrode, the third source electrode, and the third drain electrode.

22. The liquid crystal display of claim 17, wherein the area of the first sub-pixel electrode is larger than the area of the second sub-pixel electrode.

23. The liquid crystal display of claim 17, wherein the first source electrode, the first gate electrode, and the first semiconductor are respectively connected to the second source electrode, the second gate electrode, and the second semiconductor.

* * * * *